United States Patent
Maeno

(10) Patent No.: US 9,898,525 B2
(45) Date of Patent: Feb. 20, 2018

(54) INFORMATION PROCESSING DEVICE WHICH CARRIES OUT RISK ANALYSIS AND RISK ANALYSIS METHOD

(71) Applicant: NEC Corporation, Minato-ku, Tokyo (JP)

(72) Inventor: Yoshiharu Maeno, Tokyo (JP)

(73) Assignee: NEC CORPORATION, Tokyo (JP)

( * ) Notice: Subject to any disclaimer, the term of this patent is extended or adjusted under 35 U.S.C. 154(b) by 304 days.

(21) Appl. No.: 14/652,191

(22) PCT Filed: Dec. 16, 2013

(86) PCT No.: PCT/JP2013/007372
§ 371 (c)(1),
(2) Date: Jun. 15, 2015

(87) PCT Pub. No.: WO2014/097598
PCT Pub. Date: Jun. 26, 2014

(65) Prior Publication Data
US 2015/0370886 A1    Dec. 24, 2015

(30) Foreign Application Priority Data
Dec. 17, 2012  (JP) .................. 2012-275077

(51) Int. Cl.
*G06F 17/30* (2006.01)
*G06F 11/00* (2006.01)

(52) U.S. Cl.
CPC ...... *G06F 17/30598* (2013.01); *G06F 11/008* (2013.01)

(58) Field of Classification Search
None
See application file for complete search history.

(56) References Cited

U.S. PATENT DOCUMENTS 6,889,196 B1 * 5/2005 Clark ................. G06Q 10/0631
                                                            705/7.12
8,244,481 B2 * 8/2012 Zaski ........................ G01J 3/46
                                                               427/8
(Continued)

FOREIGN PATENT DOCUMENTS

JP    2005080104 A    3/2005
JP    2006127464 A    5/2006
(Continued)

OTHER PUBLICATIONS

International Search Report for PCT Application No. PCT/JP2013/007372, dated Mar. 11, 2014.
(Continued)

*Primary Examiner* — Hung Le

(57) ABSTRACT

An information processing device includes: a unit configured to compute a service influence degree for each risk factor with respect to each service, on the basis of information which indicates a relation between components which have the risk factors and other components which are influenced by the state of the components, information which denotes characteristics of the respective risk factors, and information which denotes a correspondence between the services and these components; and a unit configured to compute, on the basis of the computed service influence degrees, similarities between specific risk factors and other risk factors, and for generating and outputting a set of component identification information on the basis of the computed similarities.

10 Claims, 16 Drawing Sheets

(56) References Cited

U.S. PATENT DOCUMENTS

| | | | | |
|---|---|---|---|---|
| 2006/0111934 A1* | 5/2006 | Meggs | ................... | G06Q 20/40 705/2 |
| 2006/0167784 A1* | 7/2006 | Hoffberg | .............. | G06Q 20/401 705/37 |
| 2006/0190369 A1* | 8/2006 | Ryles | ..................... | G06Q 40/00 705/35 |
| 2006/0235783 A1* | 10/2006 | Ryles | ..................... | G06Q 40/00 705/35 |
| 2010/0016743 A1* | 1/2010 | Syed | ................... | A61B 5/0452 600/509 |
| 2011/0093249 A1* | 4/2011 | Holmes | ............... | G06F 19/3493 703/6 |
| 2011/0137572 A1* | 6/2011 | Zaski | ....................... | G01J 3/46 702/22 |
| 2011/0202385 A1* | 8/2011 | Matsui | ................... | G06Q 10/06 705/7.28 |
| 2013/0013344 A1* | 1/2013 | Ernstberger | ........... | G06Q 30/00 705/4 |
| 2013/0132315 A1* | 5/2013 | Principe | ............... | G06K 9/6215 706/20 |
| 2013/0332260 A1* | 12/2013 | Cheng | ................ | G06Q 30/0243 705/14.42 |
| 2014/0149175 A1* | 5/2014 | Abbott | ............... | G06Q 10/0635 705/7.28 |

FOREIGN PATENT DOCUMENTS

| | | |
|---|---|---|
| JP | 2007509404 A | 4/2007 |
| JP | 2008532170 A | 8/2008 |
| JP | 2008217285 A | 9/2008 |
| JP | 2012094129 A | 5/2012 |
| WO | 2012086824 A1 | 6/2012 |

OTHER PUBLICATIONS

English Translation of written opinion for PCT Application No. PCT/JP2013/007372.

* cited by examiner

Fig.4

150 RISK FACTOR INFLUENCE MANAGEMENT TABLE

| RISK FACTOR POSSESSING COMPONENT IDENTIFIER | INFLUENCED COMPONENT IDENTIFIER |
|---|---|
| PS1 | VM1、VM2 |
| PS2 | VM3、VM4 |
| VM1 | AP1 |
| VM2 | AP2、AP3 |
| VM3 | AP4 |
| VM4 | AP5、AP6 |

151 RISK FACTOR INFLUENCE INFORMATION ENTRY

Fig.5

160 COMPONENT CHARACTERISTIC MANAGEMENT TABLE

| COMPONENT IDENTIFIER | $\lambda$ |
|---|---|
| PS1 | 1 |
| PS2 | 1 |
| VM1 | 1 |
| VM2 | 1 |
| VM3 | 2 |
| PS4 | 2 |
| AP1 | 3 |
| AP2 | 4 |
| AP3 | 4 |
| AP4 | 3 |
| AP5 | 3 |
| AP6 | 4 |

161 COMPONENT CHARACTERISTIC INFORMATION ENTRY

170 SERVICE MANAGEMENT TABLE

| SERVICE IDENTIFIER | APPLICATION IDENTIFIER |
|---|---|
| SV1 | AP1、AP4 |
| SV2 | AP1、AP2、AP3 |
| SV3 | AP4、AP5、AP6 |

171 SERVICE INFORMATION ENTRY

COMPUTATION RESULT OF APPLICATION INFLUENCE DEGREES

| RISK FACTOR POSSESSING COMPONENT IDENTIFIER | AP1 | AP2 | AP3 | AP4 | AP5 | AP6 |
|---|---|---|---|---|---|---|
| PS1 | 5 | 6 | 6 | 0 | 0 | 0 |
| PS2 | 0 | 0 | 0 | 6 | 6 | 7 |
| VM1 | 4 | 0 | 0 | 0 | 0 | 0 |
| VM2 | 0 | 5 | 5 | 0 | 0 | 0 |
| VM3 | 0 | 0 | 0 | 5 | 0 | 0 |
| VM4 | 0 | 0 | 0 | 0 | 5 | 6 |

COMPUTATION RESULT OF SERVICE INFLUENCE DEGREES

| RISK FACTOR POSSESSING COMPONENT IDENTIFIER | SV1 | SV2 | SV3 | TOTAL INFLUENCE DEGREE |
|---|---|---|---|---|
| PS1 | 5 | 17 | 0 | 22 |
| PS2 | 6 | 0 | 19 | 25 |
| VM1 | 4 | 4 | 0 | 8 |
| VM2 | 0 | 10 | 0 | 10 |
| VM3 | 5 | 0 | 5 | 10 |
| VM4 | 0 | 0 | 11 | 11 |

Fig.11

COMPUTATION RESULT OF DISTANCES (ij)

| RISK FACTOR POSSESSING COMPONENT IDENTIFIER | {SERVICE INFLUENCE DEGREE max − SERVICE INFLUENCE DEGREE (SV1)}$^2$ | {SERVICE INFLUENCE DEGREE max − SERVICE INFLUENCE DEGREE (SV2)}$^2$ | {SERVICE INFLUENCE DEGREE max − SERVICE INFLUENCE DEGREE (SV3)}$^2$ | DISTANCE (ij) |
|---|---|---|---|---|
| PS1 | 1 | 289 | 361 | 651 |
| PS2 | — | — | — | — |
| VM1 | 4 | 16 | 361 | 381 |
| VM2 | 36 | 100 | 361 | 497 |
| VM3 | 1 | 0 | 196 | 197 |
| VM4 | 36 | 0 | 64 | 100 |

200 RISK ANALYSIS DEVICE

| 110 | 220 |
| --- | --- |
| INFLUENCE DEGREE COMPUTATION UNIT | RISK GROUP GENERATION UNIT |

270 SERVICE MANAGEMENT TABLE

| SERVICE IDENTIFIER | APPLICATION IDENTIFIER | REQUIRED DEGREE |
| --- | --- | --- |
| SV1 | AP1, AP4 | 1.0 |
| SV2 | AP1, AP2, AP3 | 0.6 |
| SV3 | AP4, AP5, AP6 | 0.4 |

271 SERVICE INFORMATION ENTRY

COMPUTATION RESULT OF SERVICE INFLUENCE DEGREES

| RISK FACTOR POSSESSING COMPONENT IDENTIFIER | SV1 | SV2 | SV3 | TOTAL INFLUENCE DEGREE |
|---|---|---|---|---|
| PS1 | 5.0 | 10.2 | 0.0 | 15.2 |
| PS2 | 6.0 | 0.0 | 7.6 | 13.6 |
| VM1 | 4.0 | 2.4 | 0.0 | 6.4 |
| VM2 | 0.0 | 6.0 | 0.0 | 6.0 |
| VM3 | 5.0 | 0.0 | 2.0 | 7.0 |
| VM4 | 0.0 | 0.0 | 4.4 | 4.4 |

Fig.16

350 RISK FACTOR INFLUENCE MANAGEMENT TABLE

| RISK FACTOR POSSESSING COMPONENT IDENTIFIER | INFLUENCED COMPONENT IDENTIFIER | COST |
|---|---|---|
| PS1 | VM1, VM2 | 10 |
| PS2 | VM3, VM4 | 11 |
| VM1 | AP1 | 4 |
| VM2 | AP2, AP3 | 5 |
| VM3 | AP4 | 6 |
| VM4 | AP5, AP6 | 3 |

351 RISK FACTOR INFLUENCE INFORMATION ENTRY

INFORMATION PROCESSING DEVICE WHICH CARRIES OUT RISK ANALYSIS AND RISK ANALYSIS METHOD

This application is a National Stage Entry of PCT/JP2013/007372 filed on Dec. 16, 2013, which claims priority from Japanese Patent Application 2012-275077filed on Dec. 17, 2012, the contents of all of which are incorporated herein by reference, in their entirety.

TECHNICAL FIELD

The present invention relates to an information processing device which carries out risk analysis of a system, a risk analysis method and a program for the same.

BACKGROUND ART

Various technologies for analyzing risks of a system and their related technologies are known.

For example, known is a technology relating to a system for managing an availability prediction model. The availability prediction model includes a "mathematical model for computing, verifying and analyzing the availability", an arithmetic expression, a parameter and "various kinds of information about system configuration and behavior". The basic function of availability prediction is a function to predict the operating rate of an entire system.

In particular, in terms of hardware, a widely known method is the one which analyzes possibility of failure of an entire system from characteristics of the parts by using of a mathematical model such as a Fault tree. On the other hand, in terms software, a generally used method is the one which analyzes availability by describing a state transition with the use of a mathematical model and reproducing the transition by simulation. The mathematical model is, for example, a stochastic Petri network, a stochastic reward network or the like.

The availability represents the rate, to a certain time period, of a time within the certain time period available for users' use of the services. The availability is used in the same meaning as the operation rate. For example, when there is an unavailable time period of only one minute a day on the average, the availability becomes 1−1/(24×60)=0.9993 (99.93%). Generally, the availability is determined from time intervals of failure occurrences (MTBF: Mean Time Between Failures) and a time to failure repair (MTTR: Mean Time To Repair).

A description will be given below of an example of computing and verifying the availability from an availability prediction model by using of technology of stochastic Petri network or stochastic reward network.

FIG. 17 illustrates an example of a stochastic Petri network which defines state transitions in an information system. The configuration of the information system is assumed to be the one where an application AP1 operates on a virtual server VM1, and the virtual server VM1 operates on a physical server PS1. A virtual server is also referred to as a virtual machine. Hereafter, a virtual server (virtual machine) is also described as a VM (Virtual Machine). The virtual server is not a hypervisor, but is a general virtual server which is assigned to a user and thereby can be accessed by the user, that is, a user VM. Here, the hypervisor means a virtual server control program which only the datacenter administrator can access. The physical server PS1 is a physical computer on which the virtual server VM1 is operated.

In the stochastic Petri network illustrated in FIG. 17, defined states are each expressed as a rounded-corner quadrangular box.

For example, there are defined states of "physical server PS1 in operation", "virtual server VM1 in operation" and "application AP1 in operation", which each indicate that the corresponding server or application is in a state of normal operation. Also defined are states of "physical server PS1 under suspension", "virtual server VM1 under suspension" and "application AP1 under suspension", which each indicate that the corresponding server or application is in a state where any failure is occurred. Also in the stochastic Petri network, each of defined transitions is expressed by a rectangular box filled in black representing both an event to cause the transition and the transition probability of the transition, and by an arrow indicating the direction of the transition.

In the stochastic Petri network illustrated in FIG. 17, TC671 represents the followings. First, it is defined that, when the physical server PS1 is in operation, a transition from the state of "virtual server VM1 in operation" to the state of "virtual server VM1 under suspension" occurs with a probability equal to a failure rate $\lambda$VM1. Second, it is defined that, when the physical server PS1 is under suspension, a transition from the state of "virtual server VM1 in operation" to the state of "virtual server VM1 under suspension" occurs with a probability equal to "1".

Also in the stochastic Petri network, TC672 represents the followings. First, it is defined that, when the physical server PS1 is in operation, a transition from the state of "virtual server VM1 under suspension" to the state of "virtual server VM1 in operation" occurs with a probability equal to a recovery rate $\mu$VM1. Second, it is defined that, when the physical server PS1 is under suspension, a transition from the state of "virtual server VM1 under suspension" to the state of "virtual server VM1 in operation" occurs with a probability equal to "0".

Also in the stochastic Petri network, TC673 represents the followings. First, it is defined that, when the virtual server VM1 is in operation, a transition from the state of "application AP1 in operation" to the state of "application AP1 under suspension" occurs with a probability equal to a failure rate $\lambda$AP1. Second, it is defined that, when the virtual server VM1 is under suspension, a transition from the state of "application AP1 in operation" to the state of "application AP1 under suspension" occurs with a probability equal to "1".

Also in the stochastic Petri network, TC674 represents the followings. First, it is defined that, when the virtual server VM1 is in operation, a transition from the state of "application AP1 under suspension" to the state of "application AP1 in operation" occurs with a probability equal to a recovery rate $\mu$AP1. Second, it is defined that, when the virtual server VM1 is under suspension, a transition from the state of "application AP1 under suspension" to the state of "application AP1 in operation" occurs with a probability equal to "0".

By performing simulation based on such a stochastic Petri network, the availability of the system can be analyzed. For example, a value of the availability can be computed from a probability of transition to a state of "application under suspension" after the elapse of a sufficient time period. While the state of "application under suspension" is regarded as a failure if considered simply, it is general that a value of the availability varies depending on a definition of failure or operation. In general, states and transitions described in a stochastic Petri network are individually created by the datacenter administrator, taking into account characteristics of the server infrastructure and also even a datacenter operation procedure relating to the server infrastructure. Therefore, in accordance with such operation procedures, various availability prediction models are created.

Various methods for managing an availability prediction model created in that way are proposed. For example, Patent Literature 1 (PTL 1) discloses an example of a technology relating to a system for managing an availability prediction model. A method of PTL 1 predicts the operation rate of an entire system on the basis of characteristics of components that compose the system and monitoring information. Here, the characteristics are failure occurrence rates and times required for failure recovery in respective ones of computers constituting the system. The monitoring information is information about failures during operation of the system.

Patent Literature 2 (PTL 2) discloses another example of a technology relating to a system for managing an availability prediction model. A method of PTL 2 composes a fault tree for performing fault determination, on the basis of system configuration information in terms of software and hardware. Then, the method computes a non-operation rate corresponding to a failure mode, on the basis of a result of analyzing the fault information in terms of software and hardware. The method then computes a system operation rate, on the basis of the fault tree and the non-operation rate. The method subsequently determines whether or not the computed system operation rate satisfies a reference value. On the basis of the determination result, the method further extracts a basic event relevant to increase of the system operation rate. Then, on the basis of whether or not decrease of the non-operation rate of the extracted basic event is possible, the method performs a resetting process of a new non-operation rate or the like.

Patent Literature 3 (PTL 3) discloses another example of a technology relating to a system for managing an availability prediction model. A method of PTL 3 registers information about the function, configuration, security, performance and the like, in addition to about the availability, as metadata at a time of installing an application program or an application service. Then, the method uses the metadata for configuration management, failure detection, diagnosis, and analysis of recovery or the like after the registration.

Patent Literature 4 (PTL 4) discloses another example of a technology relating to a system for managing an availability prediction model. Every time a fault occurs, a method of PTL 4 records a time during which the fault is continued and the number of users who is unable to use the services because of the fault. Then, the method accumulates such data, and thereby computes a rate of fault time, a rate of fault suffering per user, and an actual non-operation rate.

Patent Literature 5 (PTL 5) discloses another example of a technology relating to a system for managing an availability prediction model. A method of PTL 5 identifies a service which uses a certain resource on the basis of system configuration information, and identifies equivalent resources having the same function, in the identified service, as that of the certain resource. Then, on the basis of states and the number of the equivalent resources, the method computes an influence degree of the certain resource on the service. Then, on the basis of a degree of importance of the service and the computed influence degree, the method computes a degree of priority of the resource. Here, the system configuration information is information which defines a function and an operation state of each resource, resources used by each service, and relations among resources in each service.

Patent Literature 6 (PTL 6) discloses an example of a technology for finding a physical resource providing a specific virtual resource. A method of PTL 6 receives sensor data outputted by an environment sensor. Here, the sensor data is data expressing change in a property value relating to operation of the physical resource. Then, the method extracts a pattern from the sensor data. Subsequently, the method compares the pattern with an identifier pattern which is already-known to be generated from the specific virtual resource and, if finding coincidence between them, the method detects that the physical resource is used for providing the specific virtual resource.

CITATION LIST

Patent Literature

PTL 1: Japanese translation of PCT application No. 2008-532170

PTL 2: Japanese Patent Application Laid-Open No. 2006-127464

PTL 3: Japanese translation of PCT application No. 2007-509404

PTL 4: Japanese Patent Application Laid-Open No. 2005-080104

PTL 5: Japanese Patent Application Laid-Open No. 2008-217285

PTL 6: Japanese Patent Application Laid-Open No. 2012-094129

SUMMARY OF INVENTION

Technical Problem

However, the technologies disclosed in the above-described Patent Literature have a problem in that, in a system for providing a service, it is impossible to appropriately present a plurality of risk factors which are desired to be simultaneously removed for the purpose of improving the availability of the service.

The reason of the impossibility of appropriately presenting a plurality of risk factors desired to be simultaneously removed is that none of the technologies disclosed in the above-described Patent Literature includes a means which will be described below. The means is a means for presenting a plurality of risk factors on the basis of relations among influences of respective ones of the plurality of risk factors on execution of the service.

Specifically, when a plurality of risk factors inhere in a system for providing a service, in order to improve the availability of the service in the system, it is necessary to simultaneously remove risk factors relating to execution of the service completely or to a possible extent.

For example, a certain service is executed by a certain application program operating on a certain virtual server on a certain physical server. In such a case, in terms of the physical server, risk factors can be substantially removed by making the machine redundant or replacing the machine by another machine with higher reliability. On the other hand, risk factors inhere also in the virtual server and in the application program. Therefore, in order to improve the availability of the service, it is desirable that those risk factors also are removed.

However, the technologies disclosed in the above-described Patent Literature do not include a means for appropriately extracting and representing those plurality of risk factors.

The objective of the present invention is to provide a risk analysis device and a risk analysis method, both of which solve the above-described problem, and also to provide a program for the same.

Solution to Problem

A risk analysis device according to one aspect of the present invention includes: influence degree computation means for computing, on the basis of risk factor influence information representing a relation between a component having a risk factor included in a system for providing services and other components included in the system which are to be influenced by a state of the component, component characteristic information representing characteristics of each of the risk factors, and service information representing correspondence between the services and the components, a service influence degree corresponding to each of the risk factors with respect to each of the services; and risk group generation means for computing, on the basis of the service influence degrees, similarities between a specific one of the risk factors and the other ones of the risk factors, and generating and outputting information including at least a set of pieces of identification information each representing the component corresponding to the risk factor selected on the basis of the similarities.

A risk analysis method according to one aspect of the present invention, which a computer executes, and includes: computing, on the basis of risk factor influence information representing a relation between a component having a risk factor, included in a system for providing services and other components included in the system which are to be influenced by a state of the component, component characteristic information representing characteristics of each of the risk factors, and service information representing correspondence between the services and the components, a service influence degree corresponding to each of the risk factors with respect to each of the services; and computing, on the basis of the service influence degrees, similarities between a specific one of the risk factors and the other ones of the risk factors, and generating and outputting information including at least a set of pieces of identification information each representing the component corresponding to the risk factor selected on the basis of the similarities.

A computer-readable non-transitory recording medium according to one aspect of the present invention for recording a program for making a computer execute: a process to computes, on the basis of risk factor influence information representing relation between a component having a risk factor, included in a system for providing services and other components included in the system which are to be influenced by a state of the component, component characteristic information representing characteristics of each of the risk factors, and service information representing correspondence between the services and the components, a service influence degree corresponding to each of the risk factors with respect to each of the services; and a process of computing, on the basis of the service influence degrees, similarities between a specific one of the risk factors and the other ones of the risk factors, generating and outputting information including at least a set of pieces of identification information each representing the component corresponding to the risk factor selected on the basis of the similarities.

Advantageous Effects of Invention

The present invention has an effect of enabling to appropriately present a plurality of risk factors which are desired to be simultaneously removed for the purpose of improving the availability of a service provided by a system.

BRIEF DESCRIPTION OF DRAWINGS

FIG. 4 is a diagram illustrating an example of a risk factor influence management table in the first exemplary embodiment.

FIG. 5 is a diagram illustrating an example of a component characteristic management table in the first exemplary embodiment.

FIG. 11 is an example of a computation result of distances which are index of similarity in the first exemplary embodiment.

FIG. 16 is a diagram illustrating an example of a risk factor influence management table in the third exemplary embodiment.

DESCRIPTION OF EMBODIMENTS

Figure 1:
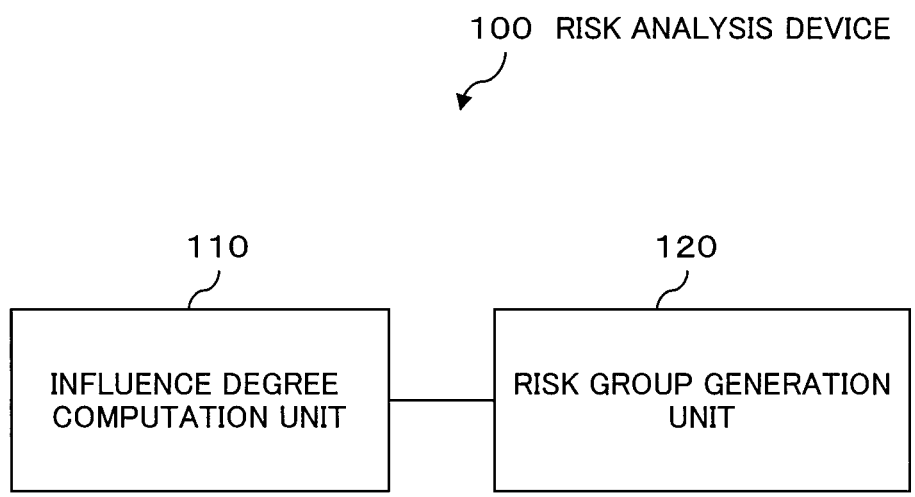
FIG. 1 is a block diagram illustrating a configuration of a risk analysis device according to a first exemplary embodiment of the present invention.

Exemplary embodiments of the present invention will be described in detail, with reference to drawings. In the drawings and the exemplary embodiments included in this description, the same sign will be assigned to components provided with the same function.

<<<First Exemplary Embodiment>>>

FIG. 1 is a block diagram illustrating a configuration of a risk analysis device 100 according to a first exemplary embodiment of the present invention.

Referring to FIG. 1, the risk analysis device 100 according to the present exemplary embodiment includes an influence degree computation unit 110 and a risk group generation unit 120.

Figure 2:
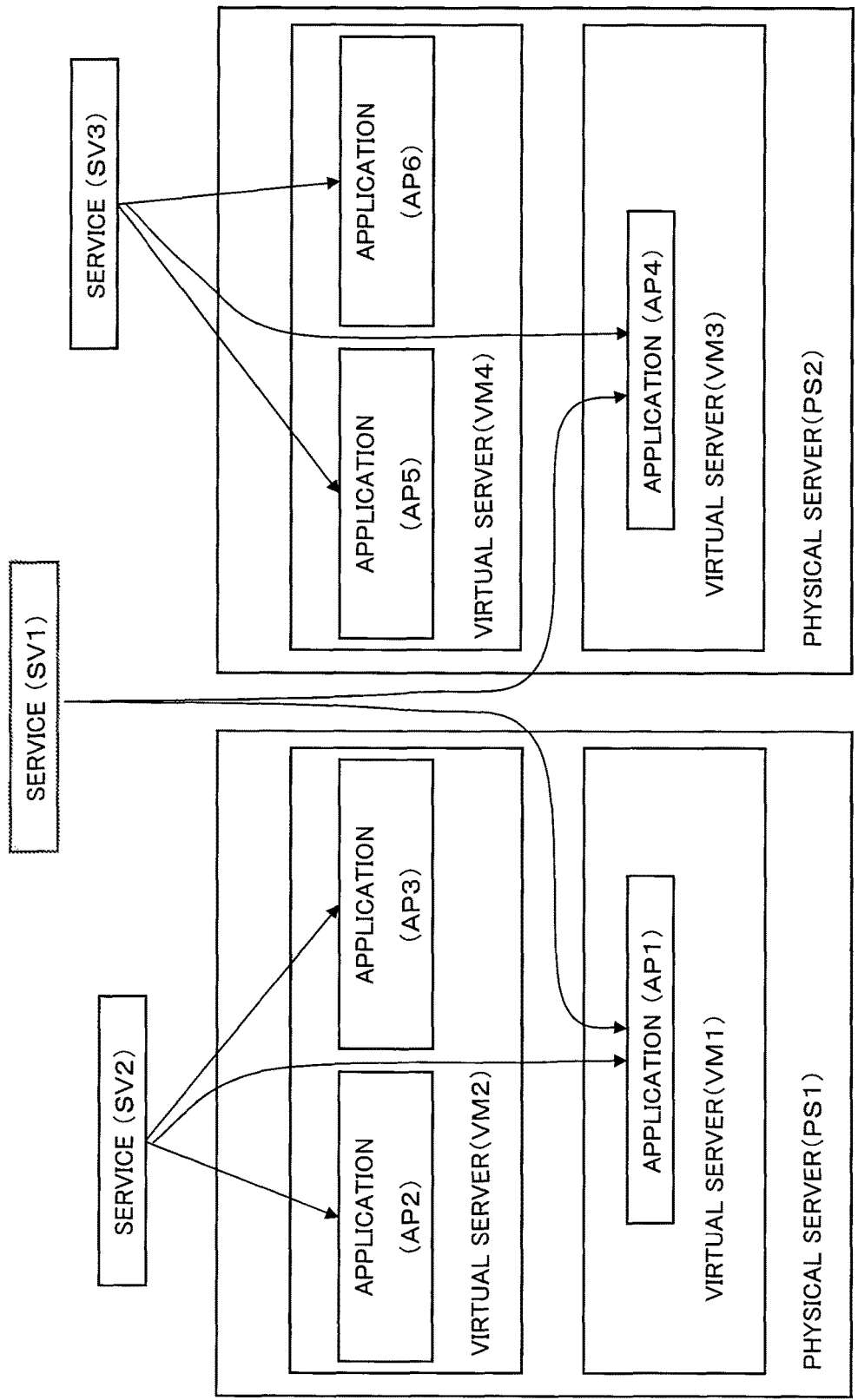
FIG. 2 is a diagram illustrating an example of a configuration of a system to be a target of risk analysis in the first exemplary embodiment.

FIG. 2 is a diagram illustrating an example of a configuration of a system to be a target of risk analysis in the present exemplary embodiment.

The system illustrated in FIG. 2 includes a physical server (PS1) and a physical server (PS2). On the physical server (PS1), a virtual server (VM1) and a virtual server (VM2) are arranged. On the physical server (PS2), a virtual server (VM3) and a virtual server (VM4) are arranged. On the virtual server (VM1), an application program (AP1) operates. On the virtual server (VM2), an application program (AP2) and an application program (AP3) operate. On the virtual server (VM3), an application program (AP4) operates. On the virtual server (VM4), an application program (AP5) and an application program (AP6) operate. Here, inside each of the pairs of parentheses ( ), the identifier of the corresponding component is shown. Hereafter, omitting the pairs of parentheses ( ), the components will be described such as, for example, a "physical server PS1".

In the system illustrated in FIG. 2, a risk factor(s) inheres in each of the physical server PS1, the physical server PS2, the virtual server VM1, the virtual server VM2, the virtual server VM3 and the virtual server VM4. In the system, a risk factor(s) inheres also in each of the application AP1, the application AP2, the application AP3, the application AP4, the application AP5 and the application AP6.

The system illustrated in FIG. 2 provides a service SV1 by using of the application AP1 and the application AP4. The system also provides a service SV2 by using of the application AP1, the application AP2 and the application AP3. The system further provides a service SV3 by using of the application AP4, application AP5 and the application AP6.

Next, each component included in the risk analysis device 100 in the first exemplary embodiment will be described. Here, the components illustrated in FIG. 1 may be components corresponding to hardware units, or may be components which are divided into functional units of computer equipment. In the present case, the components illustrated in FIG. 1 will be described as components which are divided into functional units of computer equipment.

===Influence Degree Computation Unit 110===

The influence degree computation unit 110 computes an influence degree (hereafter, referred to as a service influence degree) for each of risk factors inhering in a system on each of services provided by the system, on the basis of risk factor influence information, component characteristic information and service information. For example, the system is the one illustrated in FIG. 2.

Here, the influence degree computation unit 110 may acquire such risk factor influence information, component characteristic information and service information which are, for example, stored in an external database not illustrated in the diagram.

The risk factor influence information is information representing a relation of a first component with a second component, both of which are included in the system providing the service. The first component is a component having the corresponding risk factor. The second component is a component to be influenced by a state of the first component (a state caused by the risk factor). Here, the second component may also be a first component simultaneously.

Here, taking as an example the "relation between the virtual server VM1 and the application AP1 to be influenced by the virtual server VM1", the "influence" is defined as follows.

Figure 17:
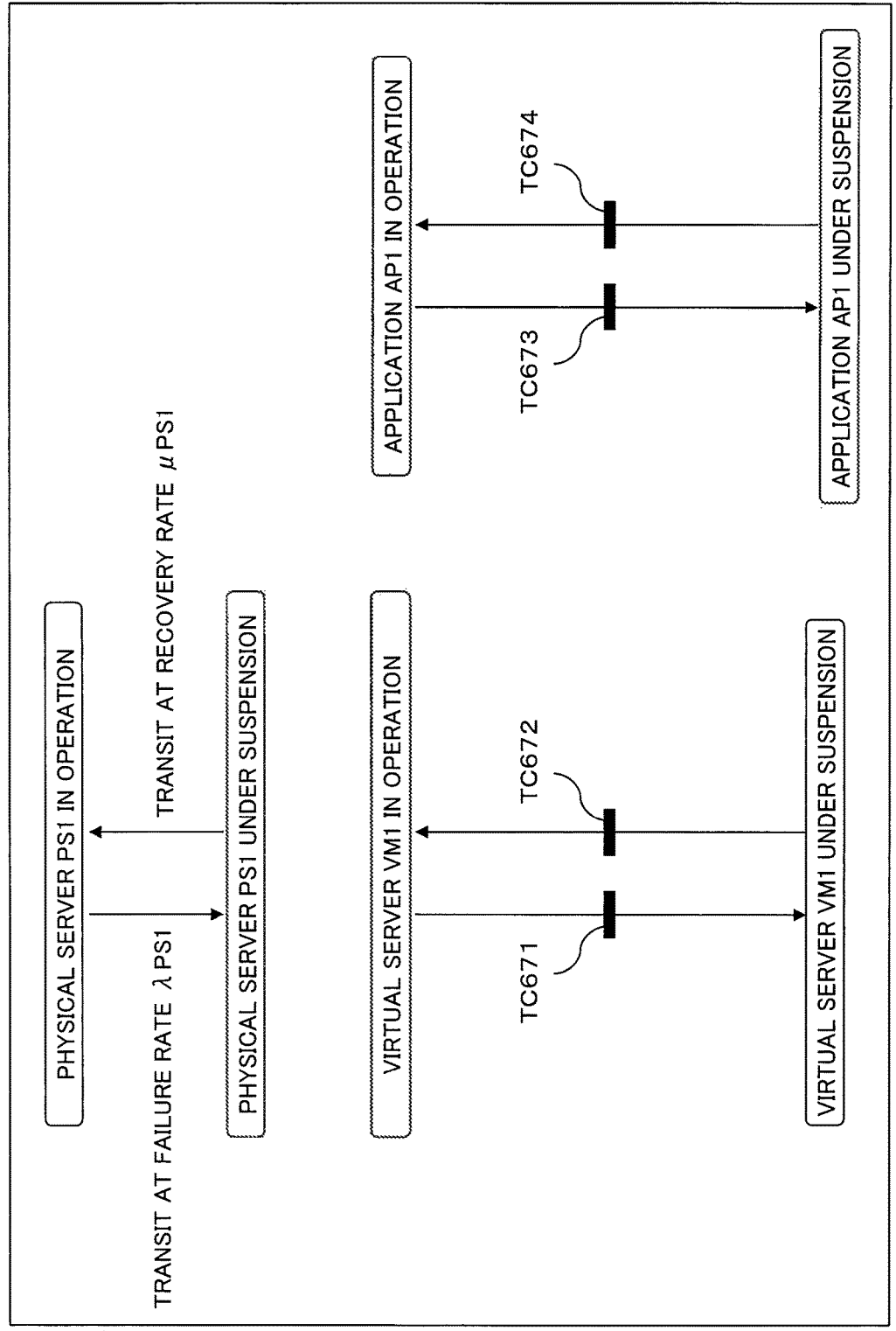
FIG. 17 is a diagram illustrating an example of a stochastic Petri network.

For example, it is assumed that, in the stochastic Petri network illustrated in FIG. 17, a transition from the state of "application AP1 in operation" to the state of "application AP1 under suspension" occurs with a probability equal to a failure rate λAP1 when the virtual server VM1 is in operation. It is also assumed that, in the stochastic Petri net, a transition from the state of "application AP1 in operation" to the state of "application AP1 under suspension" occurs with 100% probability when the virtual server VM1 is under suspension.

Thus, the "influence" is an "influence" under which a state of the application AP1 (the second component) varies depending on a state (in operation or under suspension) of the virtual server VM1 (the first component). Then, the state (in operation or under suspension) of the virtual server VM1 is a state caused by a risk factor that the virtual server VM1 has.

The component characteristics information is information representing characteristic of a risk factor including each of those first components.

Here, the characteristics of the risk factor are a failure rate, an inverse of recovery rate, a harmonic mean of the failure rate and the inverse of recovery rate, a mean time between failures, a mean time to recovery, the number of failure occurrences, the number of successful recoveries, and the like. The risk factor characteristics may include a value computed by optionally combining the above-mentioned values.

For example, the "failure rate of component" and the "recovery rate of component" each take a continuous real-valued between 0 and 1. For these values, the same values (a failure rate λ and a recovery rate μ) as those used for state transition probabilities in an availability prediction model adopting a stochastic Petri network (λAP1, λVM1 and μAP1, μVM1) may be used.

The service information is information representing a correspondence between service provided by the system and the second component described above.

===Risk Group Generation Unit 120===

The risk group generation unit 120 computes similarities among the risk factors on the basis of the service influence degree computed by the influence degree computation unit 110. Then, the risk group generation unit 120 outputs a set of pieces of identification information representing components corresponding to risk factors selected on the basis of the computed similarities. Hereafter, the "set of pieces of identification information including components corresponding to risk factors selected by the risk group generation unit 120" is referred to as a "risk factor group".

Specifically, the risk group generation unit 120 computes a value expressing similarity between a specific risk factor and other risk factor, on the basis of the service influence degrees computed by the influence degree computation unit 110. The similarity is a distance computed on the basis of the service influence degrees which correspond to the respective risk factors.

Then, on the basis of the computed similarities, the risk group generation unit 120 selects risk factors satisfying a predetermined threshold value. The predetermined threshold value may be, for example, a value expressing a specific distance. Subsequently, the risk group generation unit 120 generates and outputs a set of pieces of identification information (a risk factor group) including components corresponding to the selected risk factors and the specific risk factor. In other words, the risk factor group is information including at least a set of pieces of identification information representing components corresponding to the risk factors selected on the basis of similarities between the specific risk factor and the other risk factor, where the similarities are computed on the basis of the service influence degrees.

For example, the risk group generation unit 120 may display the risk factor group on a display (not illustrated) or output it to a file (not illustrated), as one presenting risk factors to be removed simultaneously with each other.

The above is description of each component included in the risk analysis device 100.

Figure 3:
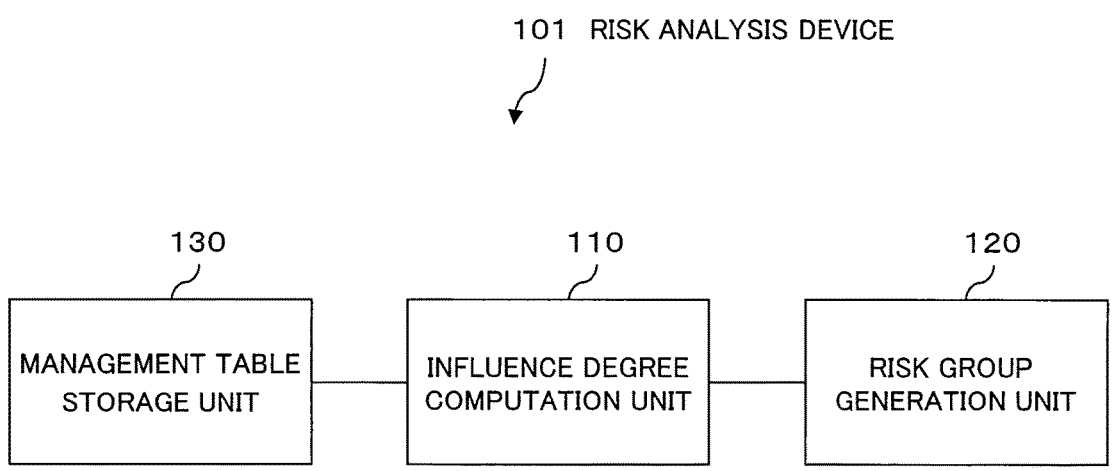
FIG. 3 is a block diagram illustrating a configuration of a risk analysis device including a management storage unit, in the first exemplary embodiment.

FIG. 3 is a diagram illustrating a configuration of a risk analysis device 101. As illustrated in FIG. 3, the risk analysis device 101 further includes a management table storage unit 130 in addition to the configuration of the risk analysis device 100.

===Management Tables Storage Unit 130===

The management table storage unit 130 stores a risk factor influence management table 150, a component characteristic management table 160 and a service management table 170. That is, the risk analysis device 101 is equivalent to the risk analysis device 100 further including a means for storing the above-described risk factor influence information, component characteristic information and service information.

The content of each of the management tables held by the management table storage unit 130 may be data read by the risk analysis device 101 via a network not illustrated. The content may also be data inputted by a human administrator directly from an input means not illustrated. The not-illustrated means may be an input unit 704 which will be illustrated later in FIG. 7.

===Risk Factor Influence Management Table 150===

FIG. 4 is a diagram illustrating an example of the risk factor influence management table 150 corresponding to the system illustrated in FIG. 2. The risk factor influence management table 150 includes a plurality of risk factor influence information entries 151. Each of the risk factor influence information entries 151 consists of a combination of the identifier of a component having a risk factor (a risk factor possessing component identifier) and the respective identifiers of other components to be influenced by the component (influenced component identifiers).

For example, the risk factor influence information entry 151 in the first row expresses that a risk factor inhering in the physical server PS1 influences the virtual server VM1 and the virtual server VM2. Such a risk factor having a possibility of influencing operation of a plurality of machines (components), causing simultaneous failures to occur in those machines (components) and thereby influencing execution of the user services is referred to also as a common risk factor. However, in the present exemplary embodiment, such the common risk factor is also described simply as a risk factor.

In the present exemplary embodiment, the identifier of a component having above-mentioned common risk factor is defined as the risk factor possessing component identifier. However, the identifier of a component having a risk factor not being a common risk factor, such as an application APk, may also be included as the risk factor possessing component identifier.

The risk factor held by each of the components is caused by, for example, a fault or a failure such as the component is stopped. For example, the component is a physical server, a virtual server, a router or the like. Further, regarding an application program as a kind of machine, the component may also be an application program. Identifiers of those components use resource identifiers which enable to identify individual machines (components), such as a "virtual server identifier", a "router identifier" and an "application program identifier".

A machine (component) influenced by the risk factor also is a physical server, a virtual server, a router, an application program or the like.

When a single machine has a plurality of risk factors, different virtual components having respective ones of the risk factors may be defined. That is, in each of exemplary embodiments in this description, descriptions are made in a manner of assuming one-to-one correlations of components with risk factors. However, none of the exemplary embodiments restricts physical or logical machines and risk factors to have one-to-one correlations.

The risk factor influence management table 150 may be stored as a table in a relational database, or may be stored in a file in a text format. The risk factor influence management table 150 may be controlled in a manner of enabling both addition of new items one after another into the risk factor influence management table 150 and deletion or correction of an item already described in the risk factor influence management table 150.

===Component Characteristic Management Table 160===

FIG. 5 is a diagram illustrating an example of the component characteristic management table 160 corresponding to the system illustrated in FIG. 2. The component characteristic management table 160 includes a plurality of component characteristic information entries 161. Each of the component characteristic information entries 161 consists of a combination of the identifier of a component having a risk factor (a risk factor possessing component identifier) and a characteristic of the risk factor (in FIG. 5, a failure rate $\lambda$).

For example, the failure rate $\lambda$ illustrated in FIG. 5 is that obtained by converting, into an integer value, a value to two decimal places of a failure rate $\lambda$ used for state transition probabilities in an availability prediction model adopting a stochastic Petri network.

The component characteristic management table 160 may be stored as a table in the relational database, or may be stored in a file in a text format. The component characteristic management table 160 may be controlled in a manner of enabling both addition of new items one after another into the component characteristic management table 160 and deletion or correction of an item already described in the component characteristic management table 160.

===Service management table 170===

Figure 6:
FIG. 6 is a diagram illustrating an example of a service management table in the first exemplary embodiment.

FIG. 6 is a diagram illustrating an example of the service management table 170 corresponding to the system illustrated in FIG. 2. The service management table 170 includes a plurality of service information entries 171. Each of the service information entries 171 consists of a combination of a service identifier which is the identifier of the corresponding one of services provided by the system and second components corresponding to the service. Here, the second component is, for example, application program.

The service management table 170 may be stored as a table in the relational database, or may be stored in a file in a text format. The service management table 170 may be controlled in a manner of enabling both addition of new items one after another into the service management table 170 and deletion or correction of an item already described in the service management table 170.

The above is explanation on each component in the unit of function of the risk analysis device 100 and the risk analysis device 101.

Next, a component of a hardware unit of the risk analysis device 100 and the risk analysis device 101 will be described.

Figure 7:
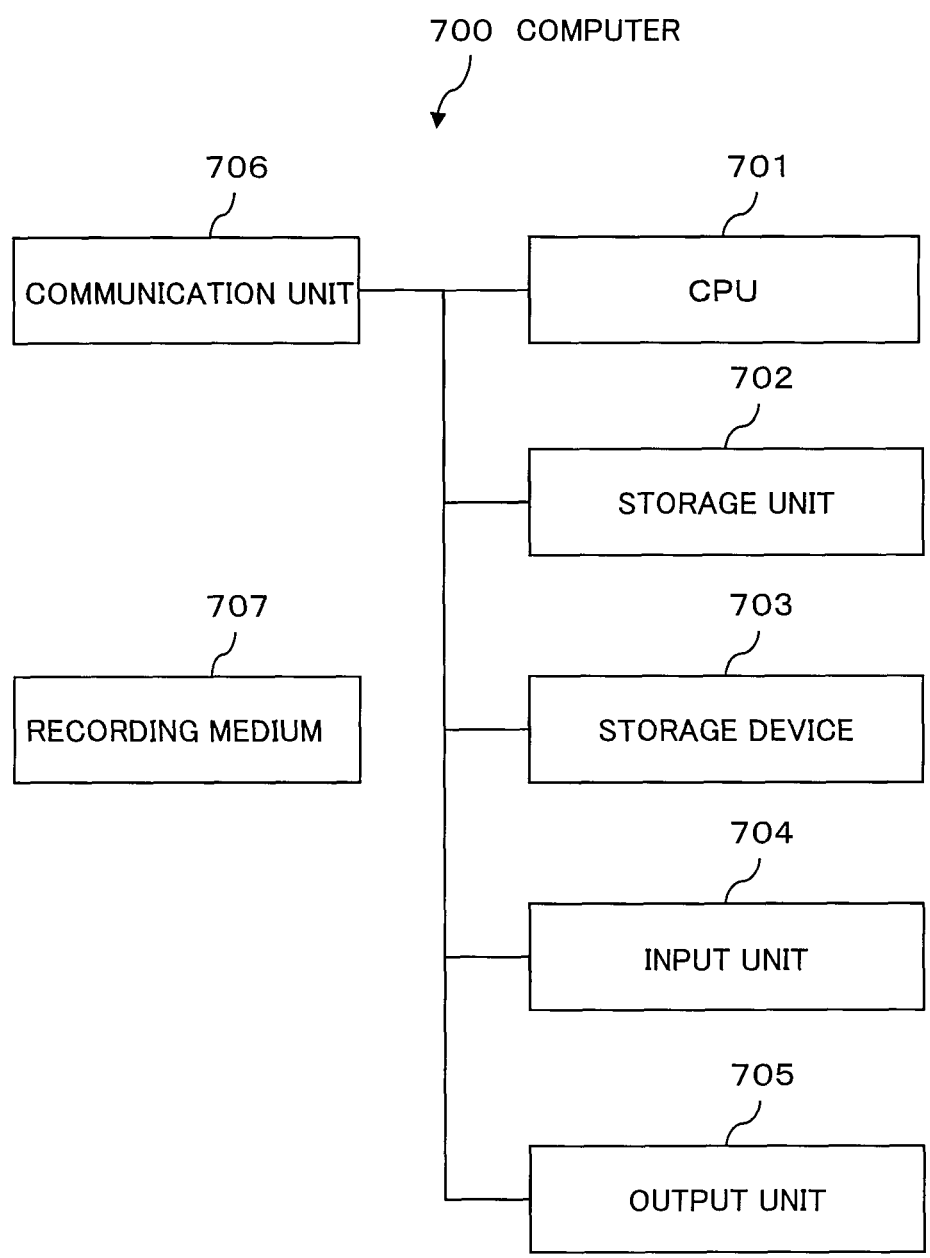
FIG. 7 is a block diagram illustrating a hardware configuration of a computer for realizing the risk analysis device according to the first exemplary embodiment.

FIG. 7 is a diagram illustrating a hardware configuration of a computer 700 for implementing the risk analysis device 100 and the risk analysis device 101 according to this exemplary embodiment.

As illustrated in FIG. 7, the computer 700 includes a CPU (Central Processing Unit) 701, a storage unit 702, a storage device 703, an input unit 704, an output unit 705, and a communication unit 706. In addition, the computer 700 includes a recording medium (or a storage medium) 707 provided externally. The recording medium 707 may be a nonvolatile recording medium storing information non-temporarily.

The CPU 701 controls the entire operation of the computer 700 by causing the operating system (not illustrated) to operate. In addition, the CPU 701 loads a program or data from the recording medium 707 supplied to the storage device 703, for example, and writes the loaded program or data in the storage unit 702. Here, the program is, for example, a program for causing the computer 700 to perform the operations in the flowcharts presented in FIG. 8 to be described later.

Then, the CPU 701 carries out various processes as the influence degree computation unit 110 and risk group generation unit 120 presented in FIGS. 1 and 3, according to the loaded program or on the basis of the loaded data.

Alternatively, the CPU 701 may be configured to download a program or data from an external computer (not illustrated) connected to a communication network (not illustrated), to the storage unit 702.

The storage unit 702 stores programs and data. The storage unit 702 may include the management table storage unit 130.

For example, the storage device 703 is an optical disc, a flexible disc, a magnetic optical disc, an external hard disk, or a semiconductor memory, and includes the recording medium 707. The storage device 703 (recording medium 707) records a program so that it is computer-readable. The storage device 703 may record data. The storage device 703 may include the management table storage unit 130.

The input unit 704 is realized by a mouse, a keyboard, or a built-in key button, for example, and used for an input operation. The input unit 704 is not limited to a mouse, a keyboard, or a built-in key button, it may be a touch panel, for example.

The output unit 705 is realized by a display, for example, and is used in order to check the output.

The communication unit 706 realizes interface to an external device. The communication unit 706 may be included in the influence degree computation unit 110, risk group generation unit 120 and management table storage unit130 as a part of each of them.

As described above, the blocks serving as functional units of the risk analysis device 100 illustrated in FIG. 1 and the risk analysis device 101 illustrated in FIG. 3 may be implemented by the computer 700 having the hardware configuration illustrated in FIG. 7. However, means for implementing the units included in the computer 700 are not limited to those described above. In other words, the computer 700 may be implemented by a single physically-integrated device, or may be implemented by two or more physically-separated devices that are connected to each other with wire or by wireless.

Instead, the recording medium 707 with the codes of the above-described programs recorded therein may be provided to the computer 700, and the CPU 701 may be configured to load and then execute the codes of the programs stored in the recording medium 707. Alternatively, the CPU 701 may be configured to store the codes of each program stored in the recording medium 707, in the storage unit 702, the storage device 703, or both. In other words, this exemplary embodiment includes an exemplary embodiment of the recording medium 707 for storing programs (software) to be executed by the computer 700 (CPU 701) in a transitory or non-transitory manner.

The above is the description of hardware about each component of the computer 700 which realizes the risk analysis device 100 and the risk analysis device 101.

Next, operation of the present exemplary embodiment will be described in detail, with reference to FIGS. 1 to 11.

In the following descriptions, the physical server PS1 and the physical server PS2 illustrated in FIG. 2 will be each described also as a physical server PSi. In that case, i is 1 or 2. The virtual server VM1, the virtual server VM2, the virtual server VM3 and the virtual server VM4 will be each described also as a virtual server VMj. In that case, j is 1, 2, 3 or 4. The application AP1, the application AP2, the application AP3, the application AP4, the application AP5 and the application AP6 will be each described also as an application APk. In that case, k is 1, 2, 3, 4, 5 or 6. Further, the service SV1, the service SV2 and the service SV3 will be each described also as a service SVm. In that case, m is 1, 2 or 3.

Figure 8:
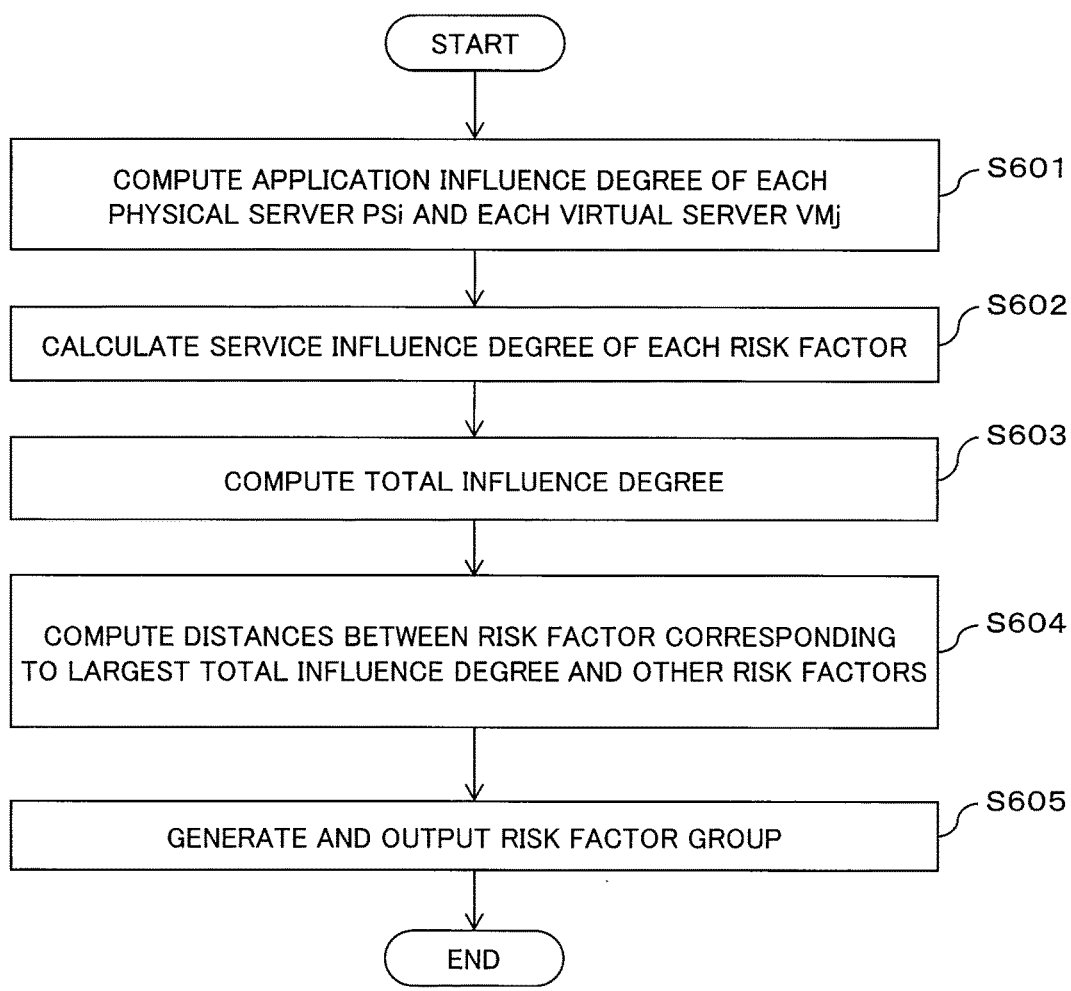
FIG. 8 is a flow chart illustrating operation of the risk analysis device in the first exemplary embodiment.

FIG. 8 is a flow chart illustrating the operation of the present exemplary embodiment. The process according to the flow chart may be performed under program control by the CPU mentioned above. Names of the process steps will be described by signs, such as S601.

On the basis of the risk factor influence management table 150 and the component characteristic management table 160, the influence degree computation unit 110 computes an application influence degree of each physical server PSi and of each virtual server VMj on each application APk (S601).

With respect to the physical server PSi, the influence degree computation unit 110 computes an application influence degree (PSi→APk) by using of an equation 1 shown below.

$$\text{Application influence degree}(PSi \rightarrow APk) = \lambda PSi + \lambda VMj + \lambda Pk \quad \text{(equation 1)}:$$

wherein, $\lambda PSi$ is the failure rate $\lambda$ of the physical server PSi of the component characteristic management table 160, $\lambda VMj$ is the failure rate $\lambda$ of the virtual server VMj, and $\lambda APk$ is the failure rate of the application APk. They will be similarly used hereafter.

The application influence degree (PSi→APk) is a value which expresses influence exerted by the risk factor of the physical server PSi on operation of the application APk. The equation 1 is an equation which computes the application influence degree (PSi→APk) considering that the physical server PSi influences the virtual server VMj and the virtual server VMj does the application APk. When the application program is not influenced by the physical server, the application influence degree is determined to be "0".

The influence degree computation unit 110 determines which physical server PSi influences which application APk by referring to the risk factor influence management table 150.

Referring to the risk factor influence management table 150 of FIG. 4, for example, the physical server PS1 influences the virtual server VM1, and the virtual server VM1 does the application AP1. Accordingly, the influence degree computation unit 110 computes the application influence degree (PS1→AP1)=λPS1+λVM1+λAP1=1+2+3=6, according to the equation 1.

With respect to the virtual server VMj, the influence degree computation unit 110 computes an application influence degree (VMj→APk) by using of, for example, an equation 2 shown below, similarly to the case of the application influence degree (PSi→APk).

$$\text{Application influence degree}(VMj \to APk) = \lambda VMj + \lambda APk \quad \text{(equation 2)}.$$

Figure 9:
FIG. 9 is an example of a computation result of application influence degrees in the first exemplary embodiment.

FIG. 9 is a diagram illustrating an example of a "computation result of application influence degrees" corresponding to the system of FIG. 2. FIG. 9 is a result of computing application influence degrees by the influence degree computation unit 110 using the equations 1 and 2, on the basis of the risk factor influence management table 150 illustrated in FIG. 4 and the component characteristic management table 160 illustrated in FIG. 5. In FIG. 9, identifiers shown in the first column are the risk factor possessing component identifiers, and identifiers shown in the first row are those of applications to be influenced by the components. For example, the value given at the second row of the second column expresses the application influence degree (PS1→AP1).

Next, on the basis of the service management table 170 and the computed application influence degrees, the influence degree computation unit 110 calculates a service influence degree with respect to each of the risk factors corresponding to the respective risk factor possessing component identifiers (S602). The service influence degree is an influence degree on the respective service SVk corresponding to the each of risk factors.

With respect to the physical server PSi, the influence degree computation unit 110 computes a service influence degree (PSi→SVm) by using of, for example, an equation 3 shown below.

$$\text{Service influence degree}(PSi \to SVm) = \Sigma \text{application influence degree }(PSi \to APx) \quad \text{(equation 3)}:$$

wherein Σ indicates the total sum of the application influence degree (PSi→APx) of every application APk to be used by the service SVm.

With respect to the virtual server VMj, the influence degree computation unit 110 computes a service influence degree (VMj→SVm) by using of, for example, an equation 4 shown below.

$$\text{Service influence degree}(VMj \to SVm) = \Sigma \text{application influence degree }(VMj \to APx) \quad \text{(equation 4)}:$$

wherein Σ indicates the total sum of the application influence degree (VMj→APx) on every application APk to use the virtual server VMj.

Figure 10:
FIG. 10 is an example of a computation result of service influence degrees in the first exemplary embodiment.

FIG. 10 is a diagram illustrating an example of a "computation result of service influence degrees" corresponding to the system of FIG. 2, which is computed by the influence degree computation unit 110 using the equations 3 and 4, on the basis of the service management table 170 illustrated in FIG. 6 and the computation result of application influence degrees illustrated in FIG. 9. In FIG. 10, identifiers shown in the first column are the risk factor possessing component identifiers, and identifiers shown in the first row of the second to fourth columns are those of the services to be influenced by the components. For example, the value given in the second row of the second column expresses the service influence degree (PS1→SV1). The fifth column of FIG. 10 will be described below.

Next, on the basis of the computed service influence degrees, the risk group generation unit 120 computes a total influence degree (S603).

With respect to the physical server PSi, the risk group generation unit 120 computes a total influence degree (PSi) by using of, for example, an equation 5 shown below.

$$\text{Total influence degree}(PSi) = \Sigma \text{service influence degree}(PSi \to SVm) \quad \text{(equation 5)}:$$

wherein Σ indicates the total sum of the service influence degree (PSi→SVm) on every service SVm.

With respect to the virtual server VMj, the risk group generation unit 120 computes a total influence degree (VMj) by using of, for example, an equation 6 shown below.

$$\text{Total influence degree}(VMj) = \Sigma \text{service influence degree}(VMj \to SVm) \quad \text{(equation 6)}:$$

wherein Σ indicates the total sum of the service influence degree (VMj→SVm) on every service SVm.

The fifth column of FIG. 10 shows an example of total influence degrees (PSi) computed by the risk group generation unit 120 using the equations 5 and 6, on the basis of the computation result of service influence degrees.

Next, on the basis of the computed service influence degrees, the risk group generation unit 120 computes a distance of each of the risk factors with reference to a risk factor having a largest total influence degree, using an equation 7 (S604). In the present case, the "risk factor having a largest total influence degree" is the specific risk factor mentioned before.

For example, the risk group generation unit 120 computes a distance (ij) by using of the equation 7 shown below. Here, the distance (ij) is an evaluation value of the similarity, to the largest risk factor, of a risk factor inhering in each physical server PSi or in each virtual server VMj. A risk factor having a small distance is a risk factor having a high similarity.

$$\text{distance}(ij) = \Sigma \{\text{service influence degree max} - \text{service influence degree }(ij)\}^2 \quad \text{(equation 7)}:$$

wherein the "service influence degree max" represents the largest service influence degree among the service influence degrees (PSi→SVm) and service influence degrees (VMj→SVm) (in the case of the example illustrated in FIG. 10, the value "25" for the physical server PS2). The service influence degree (ij) represents each service influence degree (PSi→SVm) and each service influence degree (VMj→SVm) except for the "service influence degree max". Σ indicates the total sum of {service influence degree max−service influence degree (ij)}² with respect to every service SVm.

The equation 7 is an equation which computes, when regarding the service influence degrees as vectors in Euclidean space, a geometrical distance between the vectors. The risk group generation unit 120 may compute a Manhattan distance or a generalized Mahalanobis distance.

FIG. 11 is a diagram illustrating an example of a computation result of the distances (ij) corresponding to the system of FIG. 2, which computed by the risk group generation unit 120 using the equation 7, on the basis of the computation result of service influence degrees illustrated in FIG. 10. In FIG. 11, identifiers shown in the first column are the risk factor possessing component identifiers, the second to fourth columns show the distances for the respective services, and the fifth column shows the distances (ij).

Next, the risk group generation unit 120 generates and outputs a risk factor group (S605). Here, the risk group generation unit 120 selects risk factors corresponding to service influence degrees (ij) whose computed distance (ij) is equal to or smaller than a threshold value and a risk factor corresponding to the service influence degree max. Then, the risk group generation unit 120 generates a risk factor group consisting of component identifiers corresponding to the selected risk factors.

[Modified example of exemplary embodiment 1] In the step S604, the risk group generation unit 120 may determine an optional risk factor as the specific risk factor, in place of the risk factor corresponding to the largest total influence degree. For example, the optional risk factor is a risk factor designated by the administrator via the input unit 704. In such a case, the process of computing total influence degrees in the step S603 is not necessary.

That is, in the step S604, the risk group generation unit 120 computes distances of the respective risk factors with reference to the optional risk factor by using of the equation 7, on the basis of the computed service influence degrees.

Next, in the step S605, the risk group generation unit 120 selects the optional risk factor and risk factors corresponding to respective ones of service influence degrees (ij) whose distance (ij) is equal to or smaller than a threshold value. Then, the risk group generation unit 120 generates and outputs a risk factor group including a set of component identifiers corresponding to the selected risk factors.

According to the present modified example, when which one of the risk factors should be removed has been already determined, for example, it is possible to output a risk factor group representing the risk factor and other risk factors to be removed simultaneously with it.

Further, the risk group generation unit 120 may perform the processes of the steps S604 and S605 with respect to each and every one of the risk factors, and thereby output risk factor groups where respective ones of all the risk factors are set as the specific risk factor.

Utilizing a plurality of risk factor groups obtained in that way, the administrator can flexibly make a plan for removing risk factors.

A first effect of the above-described exemplary embodiment is that of enabling to appropriately present a plurality of risk factors which are desired to be simultaneously removed for the purpose of improving the availability of services provided by the system.

It is because the following configurations are provided. First, the influence degree computation unit 110 computes a service influence degree corresponding to each risk factor with respect to each service. Second, on the basis of the service influence degrees, the risk group generation unit 120 computees similarities (evaluation values expressing the similarities) among the risk factors and, on the basis of the similarities, generates and outputs a risk factor group.

A second effect of the above-described exemplary embodiment is that of enabling to more appropriately present a plurality of risk factors which are desired to be simultaneously removed for the purpose of improving the availability of services provided by the system, from the viewpoint of maximizing the effect of availability improvement.

It is because the risk group generation unit 120 generates and outputs a risk factor group by setting a distance between the service influence degree of a risk factor corresponding to the largest total influence degree and the service influence degree of each of the other risk factors as an evaluation value of similarity.

A third effect of the above-described exemplary embodiment is that of enabling to more appropriately present a plurality of risk factors which are desired to be simultaneously removed for the purpose of improving the availability of services provided by the system, from the viewpoint of responding to the administrator's intention.

It is because the risk group generation unit 120 generates and outputs a risk factor group by setting a distance between the service influence degree of a risk factor designated by the administrator and the service influence degree of each of the other risk factors as an evaluation value of similarity.

A fourth effect of the above-described exemplary embodiment is that of enabling to more appropriately present a plurality of risk factors which are desired to be simultaneously removed for the purpose of improving the availability of services provided by the system, from the viewpoint of flexibly making a risk removal plan.

It is because the risk group generation unit 120 generates and outputs a risk factor group with respect to each and every one of risk factors, by setting a distance between the service influence degree of the risk factor and the service influence degree of each of the other risk factors as an evaluation value of similarity. <<<Second Exemplary Embodiment>>>

Next, a second exemplary embodiment of the present invention will be described in detail, with reference to drawings. Hereinafter, description of contents overlapping with those already described above will be omitted, to the extent of not causing the description of the present exemplary embodiment to be indefinite.

Figures 12, 13:
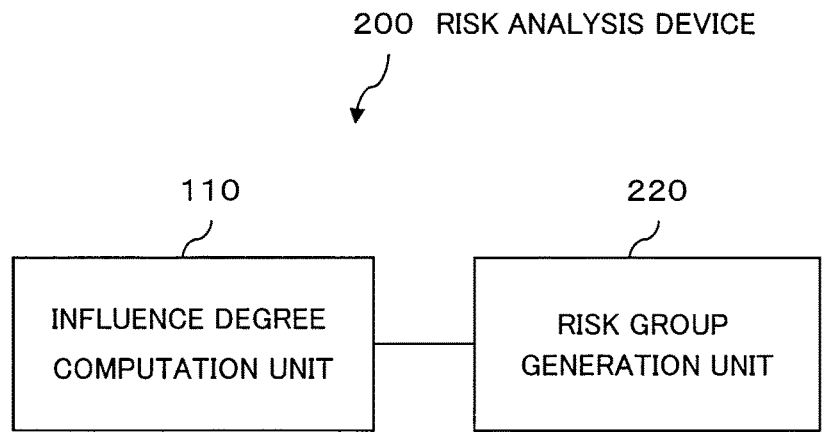
FIG. 12 is a block diagram illustrating a configuration of a risk analysis device according to a second exemplary embodiment of the present invention.
FIG. 13 is a diagram illustrating an example of a service management table in the second exemplary embodiment.

FIG. 12 is a block diagram illustrating a configuration of a risk analysis device 200 according to the second exemplary embodiment of the present invention.

Referring to FIG. 12, the risk analysis device 200 in the present exemplary embodiment is different from the risk analysis device 100 of the first exemplary embodiment in that the risk group generation unit 120 is replaced by a risk group generation unit 220.

===Risk Group Generation Unit 220===

The risk group generation unit 220 computes a total influence degree by weighting service influence degrees by service characteristics which express the characteristics of respective services. Here, the service characteristics are, for example, required degrees of the respective services, each of which is equivalent to importance of the corresponding service for the entire system. Each of the required degrees takes a continuous real-valued from 0 to 1, and indicates a higher degree of required when it takes a larger value.

For example, the required degrees are determined on the basis of service quality promised to users to use the service. For example, when service quality with respect to the service's operation rate has three grades, which are an "extremely high operation rate", a "comparatively high operation rate" and a "generally stable operation rate", the service's required degrees corresponding to those grades of service quality may be set to be 1.0, 0.6 and 0.4, respectively. The required degrees may be determined on the basis of usage fees paid by users to use the service. For example, when there are three services whose monthly usage fees are 10,000 yen, 6,000 yen and 5,000 yen, respectively, required degrees of the respective services may be set to be 1.0, 0.6 and 0.5.

FIG. 13 is a diagram illustrating an example of a service management table 270 consisting of service information entries 271 each further including a required degree.

Figure 14:
FIG. 14 is a diagram illustrating an example of a case where total influence degrees are computed by weighting service influence degrees by required degrees of the respective services.

FIG. 14 is a diagram illustrating an example of a case where total influence degrees are computed by weighting service influence degrees by the required degrees. As illustrated in FIG. 14, the risk factor possessing component identifier corresponding to the largest total influence degree (15.2) is PS1.

The effect of the present exemplary embodiment described above is, in addition to the effects of the first exemplary embodiment, that of enabling to more appropriately present a plurality of risk factors from the viewpoint of dealing with service characteristics. The plurality of risk factors are those which are desired to be simultaneously removed for the purpose of improving the availability of services provided by the system.

It is because the risk group generation unit 220 computes total influence degrees by weighting service influence degrees by service characteristics. <<<Third Exemplary Embodiment>>>

Next, a third exemplary embodiment of the present invention will be described in detail, with reference to drawings. Hereinafter, description of contents overlapping with those already described above will be omitted to the extent of not causing description of the present exemplary embodiment to be indefinite.

Figure 15:
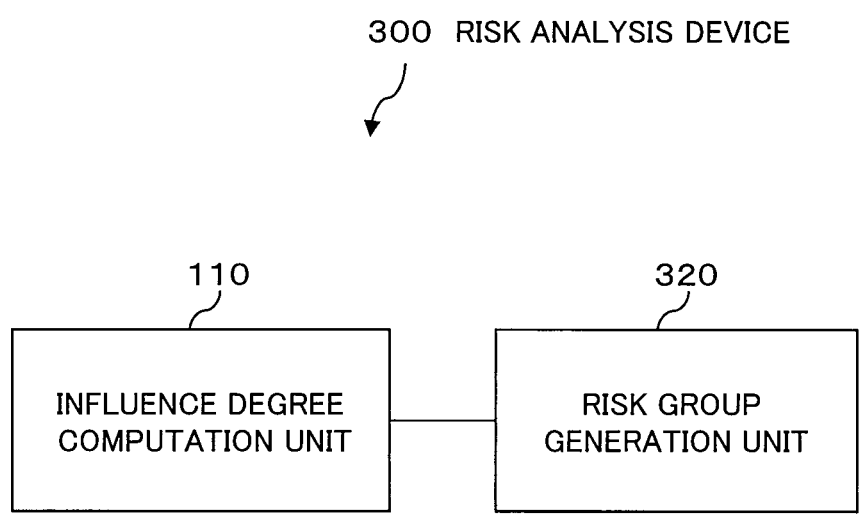
FIG. 15 is a block diagram illustrating a configuration of a risk analysis device according to a third exemplary embodiment of the present invention.

FIG. 15 is a block diagram illustrating a configuration of a risk analysis device 300 according to the third exemplary embodiment of the present invention.

Referring to FIG. 15, the risk analysis device 300 in the present exemplary embodiment is different from the risk analysis device 100 of the first exemplary embodiment in that the risk group generation unit 120 is replaced by a risk group generation unit 320.

===Risk Group Generation Unit 320===

The risk group generation unit 320 generates a risk factor group on the basis of removal cost information representing a cost for removing each of risk factors and a limit cost value. Here, the limit cost value is a value indicating a limit of the total sum of the costs. In other words, on the basis of the pieces of removal cost information, the risk group generation unit 320 generates a risk factor group in a manner of not causing the total sum of costs of risk factors included in the risk factor group to exceed a designated limit cost value.

Specifically, the risk group generation unit 320 generates a risk factor group by selecting risk factors in ascending order of distance (ij), to the extent of not causing the total sum of costs for removing the risk factors to exceed the limit cost value. That is, the risk group generation unit 320 generates a risk factor group for simultaneously removing risk factors having high similarity with each other at a cost within the given limit cost value.

The cost may be any one of the expenditure, time, period, and the number of workers, which are necessary for removing each of the risk factors, or may be a value computed by optionally combining them.

For example, when the cost is the expenditure for replacing a machine or the like, the limit cost value is a value indicating an expenditure. When the cost is the working time for replacing a machine or the like, the limit cost value is a value indicating a time. When the cost is the number of engineers involved in work of replacing a machine or the like, the limit cost value is a value indicating the number of persons.

The risk group generation unit 320 uses the limit cost value which is, for example, inputted to the risk analysis device 300 by the administrator via the input unit 704 illustrated in FIG. 7. Alternatively, the risk group generation unit 320 may receive the limit cost value from the external via the communication unit 706 illustrated in FIG. 7.

FIG. 16 is a diagram illustrating an example of a risk factor influence management table 350 consisting of risk factor influence information entries 351 each including a cost corresponding to the removal cost information.

For example, in the example of a computation result of service influence degrees illustrated in FIG. 10, a component having a risk factor corresponding to the largest total influence degree is the physical server PS2. Then, in the example of a computation result of distances illustrated in FIG. 11, the other components are lined up in ascending order of distances of their risk factors from the risk factor of the physical server PS2, as the virtual server VM4, the virtual server VM3, the virtual server VM1, the virtual server VM2 and the physical server PS1.

Here, the limit cost value is assumed to be "15", for example. In that case, the risk group generation unit 320 generates a risk factor group including the respective identifiers of the physical server PS2 (with a cost of "11") and the virtual server VM4 (with a cost of "3").

Alternatively, the limit cost value is assumed to be "20", for example. In that case, the risk group generation unit 320 generates a risk factor group including the respective identifiers of the physical server PS2 (with a cost of "11"), the virtual server VM4 (with a cost of "3") and the virtual server VM3 (with a cost of "6").

The effect of the present exemplary embodiment described above is, in addition to the effects of the first exemplary embodiment, that of enabling to more appropriately present a plurality of risk factors which are desired to be simultaneously removed, from the viewpoint of their costs.

It is because the risk group generation unit 320 generates a risk factor group, on the basis of removal cost information, in a manner of not causing the total sum of costs of risk factors included in the risk factor group to exceed a designated limit cost value.

Each component described in each above mentioned exemplary embodiment does not necessarily need to be separately independent existence. For example, as for each component, a plurality of components is realized as one module, and one component may be realized by a plurality of modules. As for each component, it may be a configuration that a certain component may be a part of the other component, and a part of a certain component and a part of the other component may overlap each other.

Each component and the module which realizes each component in each exemplary embodiment described above may be realized in terms of the hardware device or may be realized by a computer and a program if it possible as needed. Those modules may be realized by intermixture with a module in terms of the hardware, a computer, and a program.

The program is recorded in a non-volatile computer-readable recording medium such as a magnetic disk and a semiconductor memory and provided, of a computer, it is read by a computer at a time of starting of the computer. This read program functions the computer as a component in each exemplary embodiment mentioned above by controlling operation of the computer.

According to each exemplary embodiment described above, although a plurality of operations has been described in turn by the form of the flow chart, the order of the description does not limit an order of executing a plurality of operations. Therefore, when each exemplary embodiment is carried out, the order of the plurality of operations can be changed within a range of not making trouble in the contents.

Moreover, it is not limited to a plurality of operations being executed at a timing which is separately different in each exemplary embodiment described above. For example, other operations may be generated during execution of a certain operation, or an execution timing of a certain operation and other operations may overlap partially or in all.

Moreover, although a certain operation will be an opportunity of other operation in each exemplary embodiment described above, the description does not limit all relations between a certain operation and other operations. Therefore, when each exemplary embodiment is carried out, the relation of the plurality of operations can be changed within a range of not making trouble in the contents. The concrete description of each operation of each component does not limit each operation of each component. Therefore, each concrete operation of each component may be changed within limits which do not cause trouble to the characteristics of functional, efficient and others when carrying out each exemplary embodiment.

The whole or part of the exemplary embodiments disclosed above can be described as, but not limited to, the following supplementary notes.

(Supplementary Note 1) A risk analysis device including: an influence degree computation unit which computes, on the basis of risk factor influence information representing a relation between a component having a risk factor included in a system for providing services and other components included in the system which are to be influenced by a state of the component, component characteristic information representing characteristics of each of the risk factors, and service information representing correspondence between the services and the components, a service influence degree corresponding to each of the risk factors with respect to each of the services; and a risk group generation unit which computes, on the basis of the service influence degrees, similarities between a specific one of the risk factors and the other ones of the risk factors, and generates and outputs information including at least a set of pieces of identification information each representing the component corresponding to the risk factor selected on the basis of the similarities.

(Supplementary Note 2) The risk analysis device according to Supplementary Note 1, wherein the similarities are distances among service influence degrees corresponding to respective ones of the risk factors.

(Supplementary Note 3) The risk analysis device according to Supplementary Note 2, wherein each of the distances is any one of a Euclidean distance, a Manhattan distance, a Mahalanobis distance, and a value computed by optionally combining those distances.

(Supplementary Note 4) The risk analysis device according to any one of Supplementary Notes 1 to 3, wherein the risk group generation unit computes, with respect to each of the risk factors, a total influence degree obtained by summing up the service influence degrees corresponding to the risk factor, and computes the similarities between the risk factor having the largest one of the total influence degrees and the other ones of the risk factors.

(Supplementary Note 5) The risk analysis device according to Supplementary Note 4, wherein the risk group generation unit computes the total influence degrees each by weighting the service influence degrees by characteristics of respective ones of the services.

(Supplementary Note 6) The risk analysis device according to any one of Supplementary Notes 1 to 5, wherein the risk group generation unit computes the similarities between the risk factor designated from the external and the other ones of the risk factors.

(Supplementary Note 7) The risk analysis device according to any one of Supplementary Notes 1 to 6, wherein the characteristics of respective ones of the risk factors each are any one of a failure rate, an inverse of recovery rate, the harmonic mean of the failure rate, the inverse of recovery rate, a mean time between failures, a mean time to recovery, the number of failure occurrences, the number of successful recoveries, and a value computed by optionally combining them.

(Supplementary Note 8) The risk analysis device according to any one of Supplementary Notes 1 to 7, wherein the risk group generation unit generates the information including at least the set of pieces of identification information each representing the component, on the basis of removal cost information representing costs for removing respective ones of the risk factors and a limit cost value indicating a limit of the total sum of the costs.

(Supplementary Note 9) The risk analysis device according to Supplementary Note 8, wherein the costs each are any one of expenditure, time, period, the number of workers, which are necessary for removing the corresponding one of the risk factors, and a value computed by optionally combining them.

(Supplementary Note 10) The risk analysis device according to any one of Supplementary Notes 1 to 9, further including an input unit configured to accept input of any optional one of the risk factor influence information, the component characteristics information and the service information.

(Supplementary Note 11) A risk analysis method which a computer executes, including: computing, on the basis of risk factor influence information representing a relation between a component having a risk factor, included in a system for providing services and other components included in the system which are to be influenced by a state of the component, component characteristic information representing characteristics of each of the risk factors, and service information representing correspondence between the services and the components, a service influence degree corresponding to each of the risk factors with respect to each of the services; and computing, on the basis of the service influence degrees, similarities between a specific one of the risk factors and the other ones of the risk factors, and generating and outputting information including at least a set of pieces of identification information each representing the component corresponding to the risk factor selected on the basis of the similarities.

(Supplementary Note 12) The risk analysis method according to Supplementary Note 11, wherein, when computing the similarities, the computer computes, with respect to each of the risk factors, a total influence degree obtained by summing up the service influence degrees corresponding to the risk factor, and computes the similarities between the risk factor having the largest one of the total influence degrees and the other ones of the risk factors.

(Supplementary Note 13) The risk analysis method according to supplementary note 12, wherein, when computing the total influence degrees, the computer computes the total influence degrees each by weighting the service influence degrees by characteristics of respective ones of the services.

(Supplementary Note 14) The risk analysis method according to any one of Supplementary Notes 11 to 13, wherein, when generating information including at least a set of pieces of identification information each representing the component, the computer generates the information on the basis of removal cost information representing costs for removing respective ones of the risk factors and a limit cost value indicating a limit of the total sum of the costs.

(Supplementary Note 15) A program for making a computer execute: a process to computes, on the basis of risk factor influence information representing relation between a component having a risk factor, included in a system for providing services and other components included in the system which are to be influenced by a state of the component, component characteristic information representing characteristics of each of the risk factors, and service information representing correspondence between the services and the components, a service influence degree corresponding to each of the risk factors with respect to each of the services; and a process of computing, on the basis of the service influence degrees, similarities between a specific one of the risk factors and the other ones of the risk factors, generating and outputting information including at least a set of pieces of identification information each representing the component corresponding to the risk factor selected on the basis of the similarities.

(Supplementary Note 16) The program according to supplementary note 15, wherein, when computing the similarities, the program makes the computer execute a process to compute, with respect to each of the risk factors, a total influence degree obtained by summing up the service influence degrees corresponding to the risk factor, and computes the similarities between the risk factor having the largest one of the total influence degrees and the other ones of the risk factors.

(Supplementary Note 17) The program according to Supplementary Note 16, wherein, when computing the total influence degrees, the program makes the computer execute a process to compute the total influence degrees each by weighting the service influence degrees by characteristics of respective ones of the services.

(Supplementary Note 18) The program according to any one of Supplementary Notes 15 to 17, wherein, when generating information including at least a set of pieces of identification information each representing the component, the program makes the computer execute a process to generate the information on the basis of removal cost information representing costs for removing respective ones of the risk factors and a limit cost value indicating a limit of the total sum of the costs.

(Supplementary Note 19) A risk analysis device including a processor and a storage unit for storing instructions to be performed by the processor in order for the processor to operate as an influence degree computation unit and as a risk group generation unit, wherein: the influence degree computation unit computes, on the basis of risk factor influence information representing a relation between a component having a risk factor included in a system for providing services and other components included in the system which are to be influenced by a state of the component, component characteristic information representing characteristics of each of the risk factors, and service information representing correspondence between the services and the components, a service influence degree corresponding to each of the risk factors with respect to each of the services, and the risk group generation unit computes, on the basis of the service influence degrees, similarities between a specific one of the risk factors and the other ones of the risk factors, and generates and outputs information including at least a set of pieces of identification information each representing the component corresponding to the risk factor selected on the basis of the similarities.

As mentioned above, although the present invention has been described with reference to the exemplary embodiments, the present invention is not limited to the above-mentioned exemplary embodiments. Various changes which a person skilled in the art can understand in the scope of the present invention can be performed in a configuration and details of the present invention.

This application claims priority based on the Japanese Patent Application No. 2012-275077 filed on Dec. 17, 2012 and the disclosure of which is hereby incorporated in its entirety.

INDUSTRIAL APPLICABILITY

The present invention can be applied to a risk analysis device which carries out risk analysis of a system, a risk analysis method and a program for the same.

REFERENCE SIGNS LIST

100 Risk analysis device
101 Risk analysis device
110 Influence degree computation unit
120 Risk group generation unit
130 Management table storage unit
150 Risk factor influence management table
151 Risk factor influence information entry
160 component characteristic management table
161 component characteristic information entry
170 Service management table
171 Service information entry
200 Risk analysis device
220 Risk group generation unit
270 Service management table
271 Service information entry
300 Risk analysis device
320 Risk group generation unit
350 Risk factor influence management table
351 Risk factor influence information entry
700 Computer
701 CPU
702 Storage unit
703 Storage device
704 Input unit
705 Output unit
706 Communication unit
707 Recording medium

What is claimed is:
1. A system comprising:
a system to provide services, the system including a plurality of components;
a risk analysis device having memory storing instructions and a processor to execution the instructions to:
compute, on the basis of risk factor influence information representing a relation between a component of said components having a risk factor and other components of said components which are to be influenced by a state of said component, component characteristic information representing characteristics of each of said risk factors, and service information representing correspondence between said services and said components, a service influence degree corresponding to each of said risk factors with respect to each of said services;

compute, on the basis of said service influence degrees, similarities between a specific one of said risk factors and the other ones of said risk factors, and generate and output information including at least a set of pieces of identification information each representing said component corresponding to said risk factor selected on the basis of said similarities; and based on the output information, remove at least two said risk factors simultaneously by one of making one of said components redundant with another component of said components, and replacing said component with another component of said components having higher reliability than said component.

2. The system according to claim 1, wherein said similarities are distances among service influence degrees corresponding to respective ones of said risk factors.

3. The system according to claim 1, wherein said risk group generation unit computes, with respect to each of said risk factors, a total influence degree obtained by summing up said service influence degrees corresponding to the risk factor, and computes said similarities between said risk factor having the largest one of said total influence degrees and the other ones of said risk factors.

4. The system according to claim 3, wherein each said total influence degree is computed by weighting said service influence degrees by characteristics of respective ones of said services.

5. The system according to claim 1, wherein said similarities between said risk factor designated from the external and the other ones of said risk factors are computed.

6. The system according to claim 1, wherein said characteristics of respective ones of said risk factors each are any one of a failure rate, an inverse of recovery rate, the harmonic mean of the failure rate, the inverse of recovery rate, a mean time between failures, a mean time to recovery, the number of failure occurrences, the number of successful recoveries, and a value computed by optionally combining them.

7. The system according to claim 1, wherein said information including at least said set of pieces of identification information each representing said component, is generated on the basis of removal cost information representing costs for removing respective ones of said risk factors and a limit cost value indicating a limit of the total sum of said costs.

8. The system according to claim 1, wherein the processor executes the instructions to further accept input of any optional one of said risk factor influence information, said component characteristics information and said service information.

9. A method which a computer executes, including:

computing, on the basis of risk factor influence information representing a relation between a component having a risk factor, included in a system for providing services and other components included in the system which are to be influenced by a state of said component, component characteristic information representing characteristics of each of said risk factors, and service information representing correspondence between said services and said components, a service influence degree corresponding to each of said risk factors with respect to each of said services;

computing, on the basis of said service influence degrees, similarities between a specific one of said risk factors and the other ones of said risk factors, and generating and outputting information including at least a set of pieces of identification information each representing said component corresponding to said risk factor selected on the basis of said similarities; and based on the output information, removing at least two said risk factors simultaneously by one of making one of said component and said other components redundant with another component included in the system, and replacing said component with another component including in the system having higher reliability than said component.

10. A non-transitory computer-readable non-transitory recording medium for recording a program for making a computer execute:

a process to compute, on the basis of risk factor influence information representing relation between a component having a risk factor, included in a system for providing services and other components included in the system which are to be influenced by a state of said component, component characteristic information representing characteristics of each of said risk factors, and service information representing correspondence between said services and said components, a service influence degree corresponding to each of said risk factors with respect to each of said services;

a process of computing, on the basis of said service influence degrees, similarities between a specific one of said risk factors and the other ones of said risk factors;

a process of generating and outputting information including at least a set of pieces of identification information each representing said component corresponding to said risk factor selected on the basis of said similarities; and based on the output information, removing at least two said risk factors simultaneously by one of making one of said component and said other components redundant with another component included in the system, and replacing said component with another component including in the system having higher reliability than said component.

* * * * *